US008893835B2

(12) United States Patent
Nam et al.

(10) Patent No.: US 8,893,835 B2
(45) Date of Patent: Nov. 25, 2014

(54) WIND FLUX CONCENTRATION GUIDING DEVICE AND ENGINE ROOM LAYOUT THEREOF

(75) Inventors: Jongwoo Nam, Seoul (KR); Jonghoon Lee, Hwaseong-si (KR); Wonsik Kim, Suwon-si (KR); Jongwan Han, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 355 days.

(21) Appl. No.: 13/294,724

(22) Filed: Nov. 11, 2011

(65) Prior Publication Data

US 2012/0228044 A1 Sep. 13, 2012

(30) Foreign Application Priority Data

Mar. 10, 2011 (KR) .................. 10-2011-0021223

(51) Int. Cl.
| | |
|---|---|
| *B60K 11/08* | (2006.01) |
| *B60K 11/04* | (2006.01) |
| *F01P 11/10* | (2006.01) |
| *B60K 13/02* | (2006.01) |
| *F01P 1/00* | (2006.01) |

(52) U.S. Cl.
CPC ............ *B60K 11/04* (2013.01); *F01P 2001/005* (2013.01); *F01P 11/10* (2013.01); *B60K 11/08* (2013.01); *B60K 13/02* (2013.01); *F01P 2060/02* (2013.01)
USPC ......................................... 180/68.1; 180/68.2

(58) Field of Classification Search
USPC ............... 180/68.1, 68.2, 68.3, 68.4, 68.6
See application file for complete search history.

(56) References Cited

U.S. PATENT DOCUMENTS

| | | | | | |
|---|---|---|---|---|---|
| 4,610,326 | A | * | 9/1986 | Kirchweger et al. | 180/68.1 |
| 4,690,204 | A | * | 9/1987 | Reichel et al. | 165/44 |
| 4,702,079 | A | * | 10/1987 | Saito et al. | 60/599 |
| 4,744,411 | A | * | 5/1988 | Lohmann | 165/41 |
| 5,046,550 | A | * | 9/1991 | Boll et al. | 165/41 |
| 5,058,558 | A | * | 10/1991 | Ueda et al. | 123/559.1 |
| 5,358,304 | A | * | 10/1994 | Kanemitsu et al. | 296/193.09 |
| 5,918,663 | A | * | 7/1999 | Hoglinger et al. | 165/41 |
| 6,302,228 | B1 | * | 10/2001 | Cottereau et al. | 180/68.1 |
| 6,394,210 | B2 | * | 5/2002 | Matsuda et al. | 180/68.1 |
| 6,435,295 | B1 | * | 8/2002 | Weigele et al. | 180/68.4 |

(Continued)

FOREIGN PATENT DOCUMENTS

| | | |
|---|---|---|
| JP | 10-252485 A | 9/1998 |
| JP | 2004-114984 A | 4/2004 |

(Continued)

*Primary Examiner* — Katy M Ebner
(74) *Attorney, Agent, or Firm* — Morgan, Lewis & Bockius LLP

(57) ABSTRACT

An engine room layout using a wind flux concentration guiding device, may include an intake system having an air intake, a turbocharger, and an intercooler, and may be disposed in an engine room, a cooling module having a condenser and a radiator, a main duct that introduces wind passing through a front end part forming the front of the engine room and discharges the wind to the air intake and the intercooler, a sub-duct that introduces the wind passing through the front end part from different positions and discharges the wind to the intercooler, and a diverging duct that may be connected to a wind channel of the main duct to diverge some of the wind introduced into the main duct before the wind passes out of the main duct, and send the wind to the air intake.

10 Claims, 3 Drawing Sheets

(56) References Cited

U.S. PATENT DOCUMENTS

| | | | | |
|---|---|---|---|---|
| 6,698,539 | B2 * | 3/2004 | Decuir | 180/68.3 |
| 6,938,614 | B2 * | 9/2005 | Criddle et al. | 123/559.1 |
| 6,966,293 | B1 * | 11/2005 | Patillo | 123/198 E |
| 7,152,706 | B2 * | 12/2006 | Pichler et al. | 180/68.3 |
| 7,334,654 | B2 * | 2/2008 | Sasano et al. | 180/68.1 |
| 7,383,905 | B2 * | 6/2008 | Lang et al. | 180/68.1 |
| 7,523,798 | B2 * | 4/2009 | Muramatsu et al. | 180/68.1 |
| 7,537,072 | B2 * | 5/2009 | Sturmon et al. | 180/68.1 |
| 7,784,576 | B2 * | 8/2010 | Guilfoyle et al. | 180/68.1 |
| 7,814,963 | B2 * | 10/2010 | Adamson et al. | 165/41 |
| 8,028,782 | B2 * | 10/2011 | Goda et al. | 180/69.2 |
| 8,042,635 | B2 * | 10/2011 | Kang | 180/68.4 |
| 8,277,548 | B2 * | 10/2012 | Kleinfeld et al. | 96/380 |
| 8,365,854 | B2 * | 2/2013 | Lee et al. | 180/68.1 |
| 8,371,407 | B2 * | 2/2013 | Hassdenteufel et al. | 180/68.4 |
| 2002/0079151 | A1 * | 6/2002 | Decker et al. | 180/68.4 |
| 2006/0102109 | A1 * | 5/2006 | Becker et al. | 123/41.48 |
| 2007/0175687 | A1 * | 8/2007 | Yatagai et al. | 180/190 |
| 2008/0017138 | A1 * | 1/2008 | Rogg | 123/41.05 |

FOREIGN PATENT DOCUMENTS

| | | |
|---|---|---|
| JP | 2006-44572 A | 2/2006 |
| JP | 2007-137295 A | 6/2007 |
| JP | 2010-6140 A | 1/2010 |
| JP | 2010-106723 A | 5/2010 |
| JP | 2010-208482 A | 9/2010 |
| KR | 10-0448494 B1 | 9/2004 |
| KR | 10-2007-0108034 A | 11/2007 |
| KR | 10-2009-0078957 A | 7/2009 |

* cited by examiner

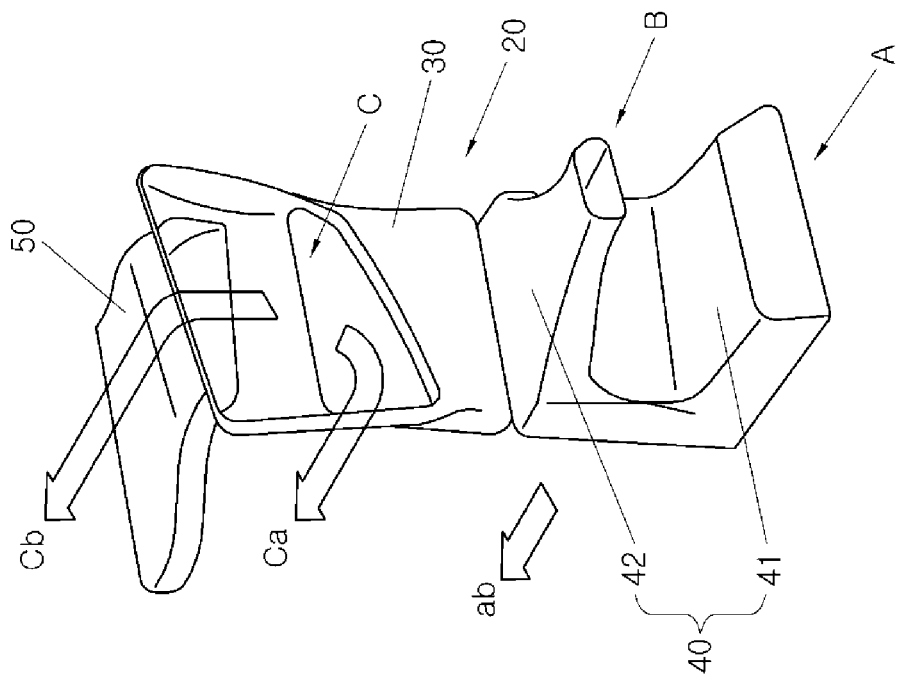
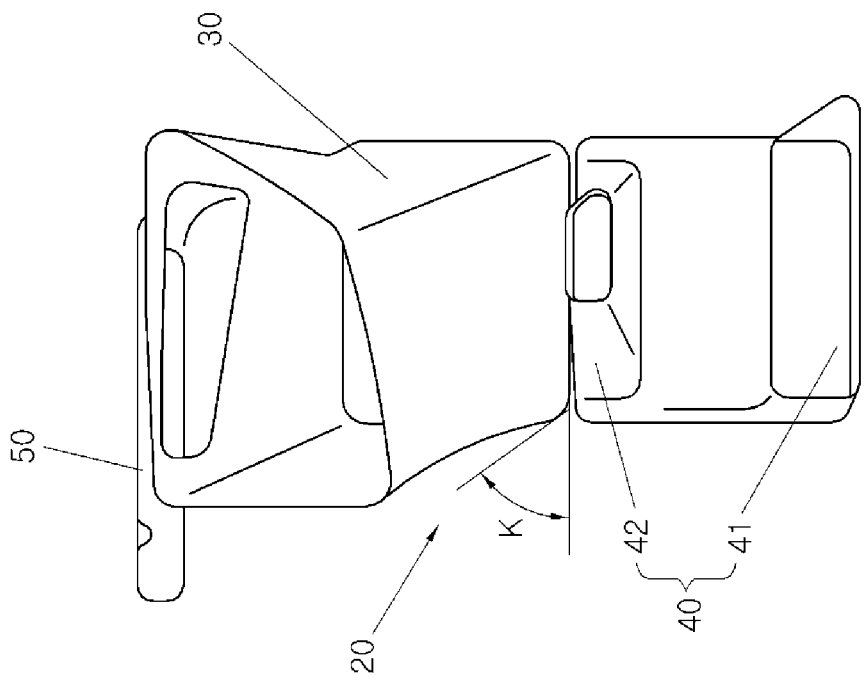

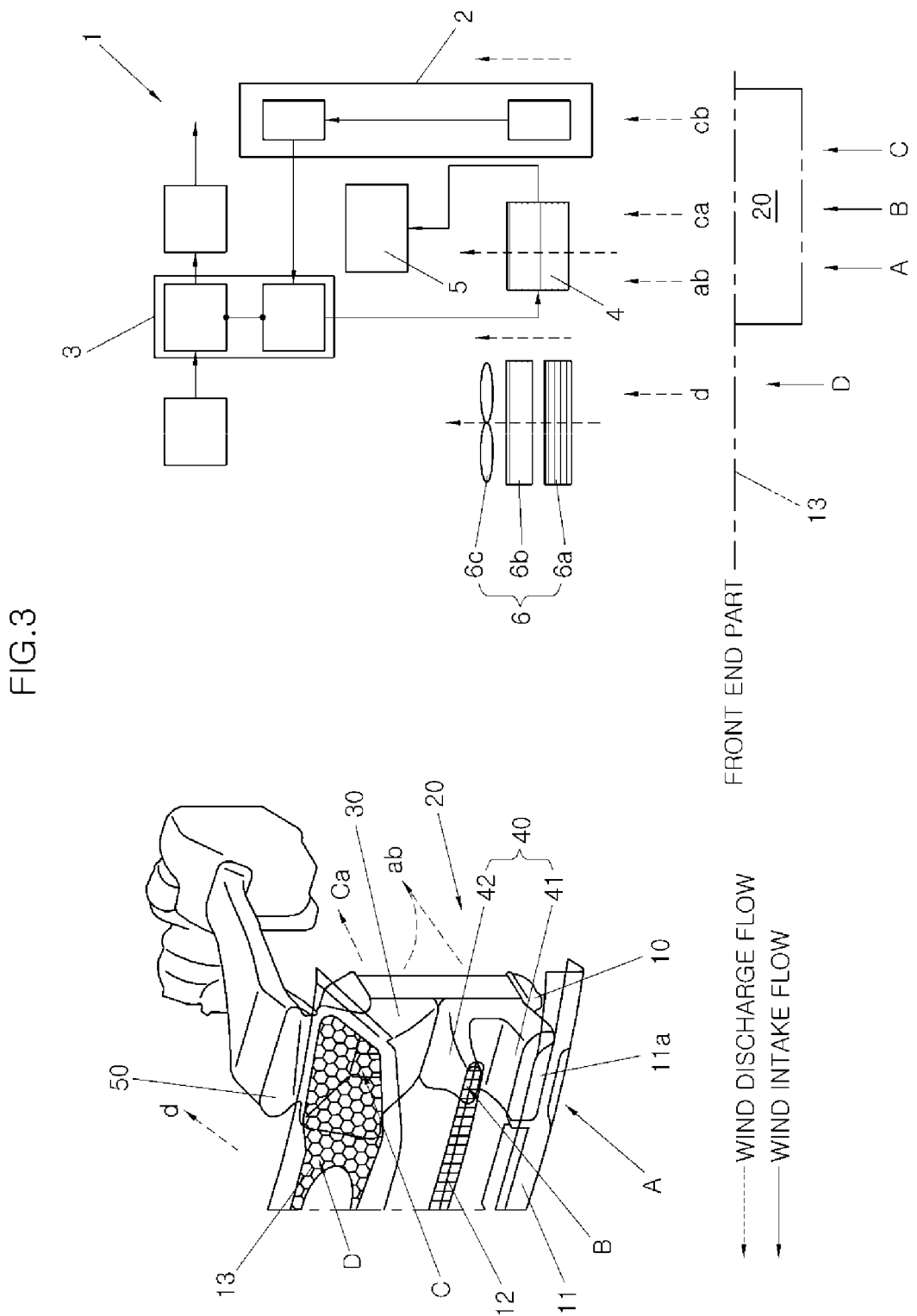

WIND FLUX CONCENTRATION GUIDING DEVICE AND ENGINE ROOM LAYOUT THEREOF

CROSS-REFERENCE TO RELATED APPLICATIONS

The present application claims priority to Korean Patent Application Number 10-2011-0021223 filed Mar. 10, 2011, the entire contents of which application is incorporated herein for all purposes by this reference.

BACKGROUND OF THE INVENTION

1. Field of the Invention

The present invention relates to a wind flux concentration guiding device, and more particularly, to a wind flux concentration guiding device that can appreciably increase cooling performance for an intercooler by increasing the inflow amount of wind, and an engine room layout with optimized layout.

2. Description of Related Art

In general, an air intake that sucks the external air passing through an air filter, an intake system that includes an intake manifold connected to a combustion chamber, a condenser of a cooling device, and a radiator of an engine cooling system are arranged around an engine disposed in an engine room.

Unlike gasoline vehicles, in an intake system of diesel and gasoline turbo engines, a turbocharger is included to increase the output of the engine by compressing the external air while an intercooler is also included with the turbocharger and cools oversupplied air flowing out of the turbocharger.

In general, an exhaust gas circulation device is connected to a turbine and an air intake is connected to a compressor in the turbocharger and the intercooler is positioned where it can receive wind well to increase cooling performance of the wind.

In diesel and gasoline turbo engine vehicles, since the intercooler is disposed close to the front end part of the front of the engine room, together with the condenser and the radiator, it is possible to increase cooling performance of wind flowing into the engine room when the vehicles travel.

As the cooling performance of the wind increases, the condenser can increase cooling performance for the interior of the vehicle, the radiator can more easily prevent the engine from being overheated, and the intercooler can improve the output and fuel efficiency of the engine with high efficiency.

As described above, effective inflow of wind increases cooling performance of the condenser and the radiator, particularly, increases cooling performance of the intercooler that is very important to improve the output and fuel efficiency of the engine.

Therefore, it is necessary to make a larger open area at the front end part to supply a larger amount of wind to the condenser, radiator, and intercooler.

However, since a radiator grill and a bumper are disposed on the front of the front end part, the front end part is very important for the external appearance of the vehicle.

Therefore, the open area of the front end part for increasing the inflow amount of wind is necessarily restricted in expanding by the degree of freedom of the external appearance and the restriction is inevitably accompanied with a limit in increasing the cooling performance of the intercooler only with the wind.

However, a high-performance engine with increased performance requires a corresponding high-efficiency intercooler and it is required to improve the cooling performance of the intercooler using wind in order to increase the efficiency of the intercooler without upgrading the specifications.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wind flux concentration guiding device that can remarkably increase the inflow amount of wind without detracting the degree of freedom in designing of the external appearance of the front of a vehicle and increase cooling performance for a condenser and a radiator by concentrating the flow of wind to the condenser, radiator, and intercooler, and particularly, increase the performance of the intercooler in high efficiency only with the wind to fit the high-performance engine without upgrading the specifications of the intercooler.

Various aspects of the present invention may be directed to providing an engine room layout equipped with a wind flux concentration guiding device which can improve cooling performance for the engine room of wind and largely increasing intake performance by directly sending some of the wind sent to the engine room to an air intake, and accordingly can optimize the layout of the engine room for disposing a condenser, a radiator, and an intake system.

In an aspect of the present invention a wind flux concentration guiding device, wherein wind passing through a radiator grill disposed at the top of a front end part forming a front portion of an engine room may be introduced and configured to be discharged to two different parts of an intake system disposed in the engine room, and wind flowing to a bumper portion disposed at the bottom of the front end part may be introduced and configured to be discharged to any one of the two different parts.

One of the two different parts of the intake system may be an intercooler that cools oversupplied air from a turbocharger and the other one may be an air intake that introduces the external air.

A main duct may have an inlet close to the radiator grill to introduce the wind passing through the radiator grill and an outlet positioned at the top of the intercooler. A sub-duct allows the wind to flow through at least one or more positions to introduce the wind flowing to the bumper portion. A diverging duct that may be connected to a wind channel of the main duct to diverge some of the wind introduced into the main duct before the wind passes out of the outlet of the main duct, and send the diverged wind to the air intake.

The main duct may be an open channel inclined at an angle with the inlet disposed higher than the outlet, the sub-duct may be an open channel having a pair of lower intake duct and upper intake duct protruding at a distance from each other at a side to introduce the wind flowing to the bumper portion, and the diverging duct may be an open channel connected to the wind channel of the main duct.

The upper intake duct of the sub-duct and the diverging duct may have different inlet cross-sections and outlet cross-sections to may have funnel-shaped cross-sections, wherein the inlet cross-sections may be narrower than the outlet cross-sections, wherein an inlet cross-section of the lower intake duct may be substantially the same as an outlet cross-section thereof.

The wind introduced into the lower intake duct and the upper intake duct of the sub-duct may be configured to collect when being discharged from the sub-duct.

In another aspect of the present invention, an engine room layout using a wind flux concentration guiding device, may include an intake system that may include an air intake introducing external air, a turbocharger connected to an external gas circulation device, and an intercooler cooling oversupplied air and sending the air to an intake manifold, and may be disposed in an engine room, a cooling module that may include a condenser for a cooling device and a radiator for an engine cooling system and disposed at a side of the intake system, a main duct that introduces wind passing through a front end part forming the front of the engine room and discharges the wind to the air intake and the intercooler, a sub-duct that introduces the wind passing through the front end part from different positions and discharges the wind to the intercooler, and a diverging duct that may be connected to a wind channel of the main duct to diverge some of the wind introduced into the main duct before the wind passes out of the main duct, and send the wind to the air intake.

The cooling module may be cooled directly by wind passing through the radiator grill disposed at the front end part, and the wind flux concentration guiding device may be disposed at a side of the radiator grill in order not to interfere with the flow of the wind directly flowing to the cooling module.

The wind flux concentration guiding device may be combined by a duct frame disposed at the front end part.

The main duct of the wind flux concentration guiding device may be positioned at a side of the radiator grill, the diverging duct from the main duct may be directly connected to the air intake, and the lower intake duct of the sub-duct may be positioned at a bumper bracket portion where a bumper may be disposed in a bumper portion, while the upper intake duct may be positioned around an inter-bracket disposed at the bumper bracket portion at a predetermined distance.

An air inlet that may be an open space surrounding the lower intake duct and allowing wind to flow therein may be formed at the bumper bracket.

The present invention has an advantage of considerably increasing cooling performance by increasing the inflow amount of wind flowing to a condenser, a radiator, and an intercooler, and particularly, of implementing high-efficiency operation of the intercooler, which is required for a high-performance engine, only with cooling of the wind.

The present invention has an advantage of increasing the efficiency of the intercooler, using the wind, without upgrading the specifications of the intercooler, and more decreasing the outlet temperature of the intercooler under the same conditions.

The present invention has an advantage of significantly increasing intake performance by directly sending some of wind flowing into the engine to the air intake, and optimizing the layout of the engine room by optimally designing the condenser, radiator, and intake system, using the flow of wind in a wind flux concentration guiding device, in one analysis system.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 1A and 1B are views showing the configuration of a wind flux concentration guiding device according to an exemplary embodiment of the present invention.

FIG. 3 is a view showing the flow of wind in an engine room which is made by wind passing through the wind flux concentration guiding device and a radiator grill according to an exemplary embodiment of the present invention.

Figure 2B:
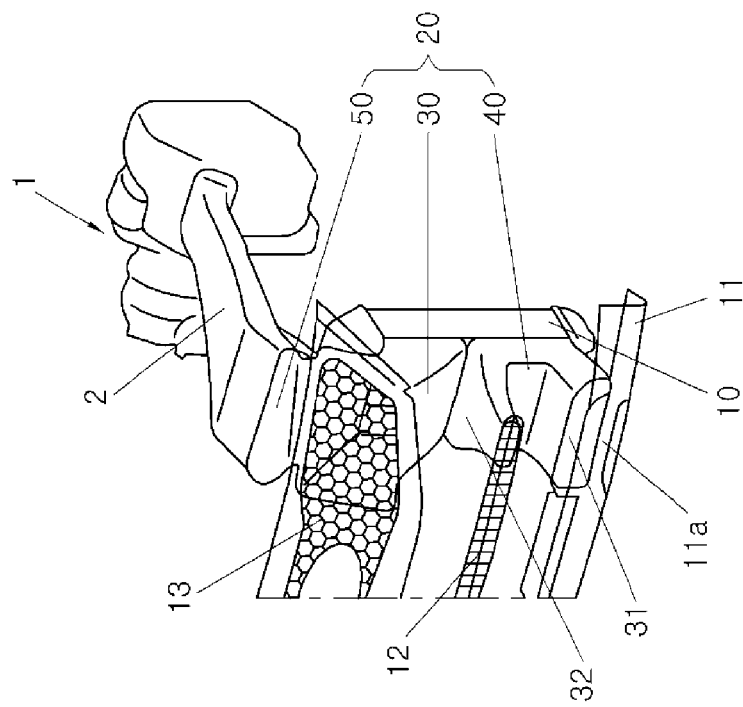
FIGS. 2A and 2B are views showing an engine room layout for a condenser, a radiator, and an intake system, which is equipped with the wind flux concentration guiding device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

Detailed Description

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter in detail with reference to the accompanying drawings, and the exemplary embodiments can be achieved in various ways by those skilled in the art and the present invention is not limited to the exemplary embodiments.

Referring to FIG. 1A, a wind flux concentration guiding device 20 can discharge wind flowing inside through at least three different positions to an intake system in an engine room through at least three different positions.

For this configuration, wind flux concentration guiding device 20 includes a main duct 30 through which wind flows, a sub-duct 40 through which wind flowing inside from at least one or more position under main duct 30 flows, and a diverging duct 50 connected to the upper portion of main duct 30 to generate flow of wind different from the flow of wind passing through main duct 30 by diverging some of the wind passing through main duct 30.

Main duct 30 has an open channel structure for sucking some of the wind passing through a radiator grill at the upper end of the front end part and discharging it to the intake system in the engine room, and is inclined at a predetermined angle K such that the inlet through which the wind flows inside is positioned higher than the outlet for discharging the wind.

Main duct 30 has an entirely uniform rectangular cross-section and the cross-section of the inlet through which the wind flows inside is formed in a contorted rectangle with one vertical side and one horizontal side inclined to fit the side shape of the radiator grill.

The wind discharged from main duct 30 forms a flow path toward the upper portion of the intercooler of the intake system in the exemplary embodiment.

Sub-duct 40 has an open channel structure for sucking the wind flowing around the bumper portion under the radiator grill from two different positions and discharging the wind to the intake system in the engine room, and for this operation, includes a pair of an upper intake duct 42 and a lower intake duct 41, which are spaced apart from each other.

Lower intake duct 41 and upper intake duct 42 protrude from one side of sub-duct 40 in a cylinder shape with an open gap therebetween and are positioned at the lower portion and the upper portion of sub-duct 40, respectively.

The wind flowing into lower intake duct 41 and upper intake duct 42 is discharged through an opening at the opposite side where lower intake duct 41 and upper intake duct 42 are not formed, of sub-duct 40, toward the intake system in the engine room.

The inlets of lower intake duct 41 and upper intake duct 42 are formed in trapezoids, and lower intake duct 41 has a uniform cross-section having the same width as sub-duct 40, whereas upper intake duct 42 has a cross-section gradually widening to fit the width of sub-duct 40 at the inlet.

That is, the inlet and outlet of the lower intake duct 41 have the same sized cross-sections, while the inlet cross-section is narrower than the outlet cross-section in upper intake duct 42, in an entire funnel shape.

The wind discharged from sub-duct 40 forms a flow path toward the lower portion of the intercooler of the intake system, in the exemplary embodiment.

Diverging duct 50 is an open channel extending from the inlet connected with the wind path of main duct 30, such that it takes some of the wind passing through main duct 30 and sends the wind to another part.

The inlet of diverging duct 50 connected with the wind path of main duct 30 has a rectangular cross-section with one horizontal side is contorted and diverging duct 50 has a cross-section that becomes wider from the inlet connected to the wind path of the main duct 30 toward the outlet, in an entirely funnel shape.

The wind discharged from diverging duct 50 is directly sent to an air intake 2 connected through diverging duct 50, such that intake performance of air intake 2 can be remarkably increased.

Referring to FIG. 1B, wind flux concentration guiding device 20 can increase cooling efficiency for the intake system by simultaneously sucking a larger amount of wind and discharging a larger amount of wind, particularly, satisfy the performance required for a high-performance engine without upgrading the specifications of the intercooler by considerably increasing the cooling efficiency for the intercooler.

Accordingly, wind flux concentration guiding device 20 can simultaneously suck wind from at least three different positions by making one wind intake flow C through main duct 30 and two wind intake flow A and B through sub-duct 40.

Wind intake flow C of main duct 30 is made by sucking the wind passing through the side of the radiator grill at the top of the front end part forming the front portion of the engine room.

A wind intake flow A of wind passing through the bumper portion at the bottom of the front end part forming the front portion of the engine room from lower intake duct 41 and a wind intake flow B of the wind passing through the bumper portion from upper intake duct 42 spaced apart from lower intake duct 41 are formed in sub-duct 40.

Meanwhile, the wind discharged from wind flux concentration guiding device 20 makes one wind discharge flow Ca through main duct 30, another one wind discharge flow ab through sub-duct 40, and another one wind discharge flow Cb through diverging duct 50, such that wind flux concentration guiding device 20 can discharge the wind simultaneously through at least three different positions.

Wind discharge flow Ca of main duct 30 is a flow of the wind that flows into main duct 30 and directly flows out through the outlet and wind discharge flow Ca makes a flow path concentrating on the upper portion of the intercooler of the intake system.

Since main duct 30 is declined at the predetermined angle K with the inlet higher than the outlet, wind discharge flow Ca is lower than wind intake flow C.

Wind discharge flow ab in sub-duct 40 is a flow where wind intake flow A in lower intake duct 41 and wind intake flow B in upper intake duct 42 a converge after the outlets. Wind discharge flow ab makes a flow path concentrating on the lower portion of the intercooler of the intake system.

Meanwhile, wind discharge flow Cb in diverging duct 50 is a flow made by some of the wind intake flow C diverging to another part before flowing out of main duct 30. Wind discharge flow Cb directly continues to air intake 2 connected through diverging duct 50.

As described above, since wind discharge flow Cb directly continues to air intake 2, the intake performance of air intake 2 can be largely increased.

Figure 2A:
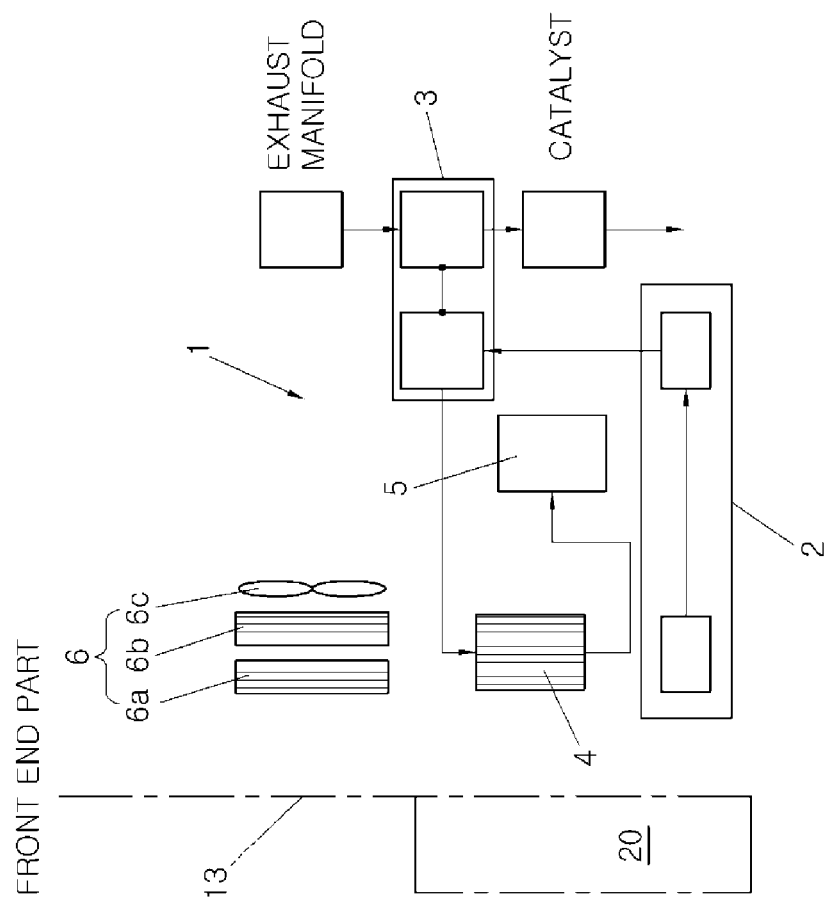

Referring to FIG. 2A, a cooling module 6 is disposed with intake system 1 in the engine room, intercooler 4 of intake system 1 is positioned close to the front end part forming the front portion of the engine room, at a side of cooling module 6, and wind flux concentration guiding device 20 that sucks the wind passing through the front end part and discharge the wind to intake system 1 is positioned ahead of intercooler 4.

Therefore, the wind passing through the front end part simultaneously makes the flow directly to cooling module 6 and the flow to the intercooler and intake system 1 through wind flux concentration guiding device 20, such that the cooling efficiency for the engine room using the wind can be significantly increased.

Intake system 1 includes common components, such as air intake 2 that sucks the external air through an air filter, turbocharger 3 that compresses the external air sucked by air intake 2 through an exhaust gas circulation device, intercooler 4 that cools the oversupplied air from turbocharger 3, and intake manifold 5 that supplies the compressed air from intercooler 4 to the engine.

However, in the exemplary embodiment, since air intake 2 is directly connected with diverging duct 50 of wind flux concentration guiding device 20, the external air can be directly sucked from wind flux concentration guiding device 20.

Turbocharger 3 has a common structure with the turbine connected with the exhaust gas circulation device and the compressor connected with intake air 2, and intercooler 4 is disposed in the path from turbocharger 3 to intake manifold 5 and cools the oversupplied compressed air from turbocharger 3.

Meanwhile, cooling module 6 constitutes the engine cooling system with condenser 6a constituting the cooling device and includes common components, such as radiator 6b with cooling fan 6c, and condenser 6a, radiator 6b, and cooling fan 6c are sequentially arranged from the front end part at the front of the engine room.

Referring to FIG. 2A, the front end part is combined with the bumper portion by a bumper bracket 11 and an inter-bracket 12 at the lower end and radiator grill 13 is disposed at the upper end to allow the wind to flow into the engine room. Further, a duct frame 10 and wind flux concentration guiding device 20 are disposed at the side to introduce the wind passing through the bumper portion and radiator grill 13.

In the exemplary embodiment, duct frame 10 has a height substantially the same as the front end part and is wide such that wind flux concentration guiding device 20 can be fitted.

As described above, when wind flux concentration guiding device 20 is mounted on the front end part, main duct 30 of wind flux concentration guiding device 20 is positioned at a side of radiator grill 13 and diverging duct 50 that diverges from main duct 30 is directly connected to air intake 2.

For this configuration, radiator grill 13 has a grill structure to allow the wind to pass, and diverging duct 50 or air intake 2 has a connection structure that can be connected by any one.

Meanwhile, lower intake duct 41 is positioned at bumper portion bracket 11 and upper intake duct 42 is positioned at inter-bracket 12, in sub-duct 40 of wind flux concentration guiding device 20.

For this configuration, bumper portion bracket 11 further has an air inlet 11a that is an open space surrounding lower intake duct 41 through which the wind passes, while inter-bracket 12 has a simple lattice structure that can pass the wind.

Referring to FIG. 3, the wind passing through the front end flows into the engine room, divided into a wind discharge flow d having a path formed toward cooling module 6 through radiator grill 13, wind discharge flows ab and Ca having paths formed from the side of radiator grill 13 and the bumper portion to intercooler 4 of intake system 1 by wind flux concentration guiding device 20, and wind discharge flow Cb having a path diverging from wind flux concentration guiding device 20 directly to air intake 2.

In the exemplary embodiment, the wind passing through radiator grill 13 directly flows into cooling module 6, without interference that induces the wind into wind flux concentration guiding device 20, by wind discharge flow d, such that condenser 6a and radiator 6b of cooling module 6 can be intensively cooled by wind discharge flow d, thereby considerably increasing cooling efficiency.

Wind discharge flow ab from wind flux concentration guiding device 20 is made when wind intake flow A made in lower intake duct 41 of sub-duct 40 through air inlet 11a of bumper portion bracket 11 and wind intake flow B made in upper intake duct 42 of sub-duct 40 through inter-bracket 12 collect outside sub-duct 40.

Wind discharge flow ab moves to intake system 1 after intensively cooling intercooler 4 while moving through the middle lower portion of intercooler 4.

Wind discharge flow Ca out of wind flux concentration guiding device 20 is formed when wind intake flow C made in main duct 30 through the side of radiator grill 13 directly moves out of main duct 30.

Wind discharge flow Ca moves to intake system 1 after intensively cooling intercooler 4 while moving through the middle upper portion of intercooler 4.

As described above, by using wind flux concentration guiding device 20, wind discharge flow about of sub-duct 40 can intensively cool the lower portion of intercooler 4 while wind discharge flow Ca out of main duct 30 can intensively cool the upper portion of intercooler 4.

Therefore, intercooler 4 that intensively receives a larger amount of wind can be operated with high efficiency required for high-performance and high-output engine and the high efficiency of intercooler 4 does not detract the degree of freedom in design of the external appearance of the vehicle, which has been necessary to allow a larger amount of wind to flow in side.

Meanwhile, in the exemplary embodiment, wind discharge flow Cb out of wind flux concentration guiding device 20 is formed while moving in diverging duct 50 and moving out of diverging duct 50 before wind intake flow C in main duct 30 moves out.

Since wind discharge flow Cb directly continues to air intake 2, the intake performance of air intake 2 can be largely increased.

As described above, in the exemplary embodiment, it is possible to remarkably increase the cooling performance of cooling module 6, using the wind flow concentrating on cooling module 6 while wind flux concentration guiding device 20 considerably improves the cooling performance and removes non-uniformity in the flow of air passing through intercooler 4 by forming the window flow concentrating on the upper portion and the lower portion of intercooler 4, such that the wind flow efficiency at the front end can be improved and the heat flow in the engine room can be optimized.

Therefore, it is advantageous in improvement of cooling performance and intake performance required with improvement of performance of intercooler 4 when the engine performance is strengthened.

For example, a measure of improving only the individual functions of intercooler 4, cooling module 6, and intake system 1, by independently handling them, in order to improve the cooling performance and the intake performance with strengthening of the engine performance in the related art, but an exemplary embodiment of the present invention may use a general measure of improving the entire performance with interaction and contribution by handling intake system 1 with cooling module 6 and intercooler 4 as one analysis system.

The general measure can use various output elements for the analysis, such as the amount of air, vehicle pressure, intake pressure, and intake temperature, such that the accuracy of the test result can be considerably increased.

Depending on experiments, it can be seen that the outlet temperature of intercooler 4 is improved about 10% to 20%, different according to the types of engines though in view of performance, and the capacity of intercooler 4 is increased about 35% to 55% in comparison to an intercooler having the same specifications, different according to the types of engines though.

In the exemplary embodiment, since the external air introduction flow is formed by directly sending the wind sucked by wind flux concentration guiding device 20 to air intake 2, it is possible to increase the intake flow rate by reducing the intake pressure when the vehicle travels, and improve the intake temperature by preventing backflow of the intake air in idling.

As described above, in the exemplary embodiment, as wind flux concentration guiding device 20 introduces a larger amount of wind and the open area of the front end part is optimized, the degree of freedom in design of the external appearance of the vehicle does not detract. Further, by using wind flux concentration guiding device 20, cooling module 6 and intake system 1 are optimally designed as one analysis system, such that the engine room layout can be optimized.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wind flux concentration guiding device, wherein wind passing through a radiator grill disposed at the top of a front end part forming a front portion of an engine room is introduced and configured to be discharged to two different parts of an intake system disposed in the engine room, wind flowing to a bumper portion disposed at the bottom of the front end part is introduced and configured to be discharged to any one of the two different parts, and one of the two different parts of the intake system is an intercooler that cools oversupplied air from a turbocharger and the other one is an air intake that introduces external air, the wind flux concentration guiding device comprising:
   a main duct that has an inlet close to the radiator grill to introduce the wind passing through the radiator grill and an outlet positioned at the top of the intercooler;
   a sub-duct that allows the wind to flow through at least one or more positions to introduce the wind flowing to the bumper portion; and
   a diverging duct that is connected to a wind channel of the main duct to diverge some of the wind introduced into the main duct before the wind passes out of the outlet of the main duct, and send the diverged wind to the air intake;
   wherein the main duct is an open channel inclined at an angle with the inlet disposed higher than the outlet;
   wherein the sub-duct is an open channel having a lower intake duct and an upper intake duct protruding at a distance from each other at a side to introduce the wind flowing to the bumper portion and discharge the wind to cool the intercooler;
   wherein the diverging duct is an open channel connected to the wind channel of the main duct; and
   wherein the upper intake duct of the sub-duct and the diverging duct have different inlet cross-sections and outlet cross-sections to have funnel-shaped cross-sections.

2. The device as defined in claim 1, wherein the inlet cross-sections of the upper intake duct of the sub-duct and the diverging duct are narrower than the outlet cross-sections of the upper intake duct of the sub-duct and the diverging duct, respectively.

3. The device as defined in claim 1, wherein an inlet cross-section of the lower intake duct is substantially the same as an outlet cross-section thereof.

4. The device as defined in claim 1, wherein the wind introduced into the lower intake duct and the upper intake duct of the sub-duct is configured to collect when being discharged from the sub-duct.

5. An engine room layout using a wind flux concentration guiding device, comprising:
   an intake system that includes an air intake introducing external air, a turbocharger connected to an exhaust gas circulation device, and an intercooler cooling oversupplied air and sending the air to an intake manifold, and is disposed in an engine room;
   a cooling module that includes a condenser for a cooling device and a radiator for an engine cooling system and disposed at a side of the intake system; and
   the wind flux concentration guiding device including:
      a main duct that introduces wind passing through a front end part forming the front of the engine room and discharges the wind to the air intake and the intercooler;
      a sub-duct that introduces the wind passing through the front end part from different positions and discharges the wind to cool the intercooler; and
      a diverging duct that is connected to a wind channel of the main duct to diverge some of the wind introduced into the main duct before the wind passes out of the main duct, and send the wind to the air intake;
   wherein the wind flux concentration guiding device is disposed at a side of a radiator grill, thereby not interfering with wind directly flowing to the cooling module such that the cooling module is cooled directly by the wind passing through the radiator grill disposed at the front end part;
   wherein the sub-duct is an open channel having a lower intake duct and an upper intake duct protruding at a distance from each other at a side;
   wherein the main duct of the wind flux concentration guiding device is positioned at the side of the radiator grill;
   wherein the diverging duct from the main duct is directly connected to the air intake; and
   wherein the lower intake duct of the sub-duct is positioned at a bumper bracket portion where a bumper is disposed in a bumper portion, while the upper intake duct is positioned around an inter-bracket disposed at the bumper bracket portion at a predetermined distance;
   wherein the upper intake duct of the sub-duct and the diverging duct have different inlet cross-sections and outlet cross-sections to have funnel-shaped cross-sections.

6. The engine room layout as defined in claim 5, wherein the wind flux concentration guiding device is combined by a duct frame disposed at the front end part.

7. The engine room layout as defined in claim 5, wherein an air inlet that is an open space surrounding the lower intake duct and allowing wind to flow therein is formed at the bumper bracket.

8. The engine room layout as defined in claim 5, wherein the inlet cross-sections of the upper intake duct of the sub-duct and the diverging duct are narrower than the outlet cross-sections of the upper intake duct of the sub-duct and the diverging duct, respectively.

9. The engine room layout as defined in claim 5, wherein an inlet cross-section of the lower intake duct is substantially the same as an outlet cross-section thereof.

10. The engine room layout as defined in claim 5, wherein the wind introduced into the lower intake duct and the upper intake duct of the sub-duct is configured to collect when being discharged from the sub-duct.

* * * * *